United States Patent [19]

Oishi et al.

[11] Patent Number: 4,870,659
[45] Date of Patent: Sep. 26, 1989

[54] FSK DEMODULATION CIRCUIT

[75] Inventors: Yasuyuki Ōishi, Kawasaki; Takeshi Takano, Ushiku; Takaharu Nakamura, Urawa; Yukio Takeda, Zama; Yasunobu Watanabe, Yokohama, all of Japan

[73] Assignee: Fujitsu Limited, Kawasaki, Japan

[21] Appl. No.: 237,535

[22] Filed: Aug. 29, 1988

[30] Foreign Application Priority Data

Aug. 29, 1987 [JP] Japan ............................ 62-216053
Sep. 17, 1987 [JP] Japan ............................ 62-233054

[51] Int. Cl.$^4$ .............................................. H03D 3/18
[52] U.S. Cl. ........................................ 375/82; 375/94; 329/303
[58] Field of Search ............... 375/45, 88, 94, 82; 455/205, 334, 337; 329/110, 126, 105, 124, 104

[56] References Cited

U.S. PATENT DOCUMENTS

| | | | |
|---|---|---|---|
| 4,338,579 | 7/1982 | Rhodes | 329/105 |
| 4,501,002 | 2/1985 | Auchterlonie | 329/124 |
| 4,718,113 | 1/1988 | Rother et al. | 455/209 |
| 4,745,627 | 5/1988 | Grubser | 375/88 |
| 4,752,742 | 6/1988 | Akaiwa | 375/88 |

FOREIGN PATENT DOCUMENTS

| | | |
|---|---|---|
| 59-126345 | 7/1984 | Japan . |
| 61-80933 | 4/1986 | Japan . |
| 62-15957 | 1/1987 | Japan . |
| 62-183648 | 8/1987 | Japan . |
| 62-196921 | 8/1987 | Japan . |

OTHER PUBLICATIONS

I. A. W. Vance, B. Eng., M. Sc, "Fully integrated radio paging receiver", IEE PROC., vol. 129, Pt. F, No. 1, Feb. 1982, pp. 2 to 6.

Primary Examiner—Benedict V. Safourek
Assistant Examiner—Stephen Chin
Attorney, Agent, or Firm—Staas & Halsey

[57] ABSTRACT

An FSK demodulation circuit which receives as input an FSK modulated reception signal, obtains two quadrature pulse trains, i.e., a first pulse train and a second pulse train, from a phase detection circuit, is provided with at least two sampling means which use the edge of one of the pulse trains and sample the logic of the other pulse train, produces two or more sample outputs at different timings, and determines the logic of the reproduced data from a combination of the logics "1" and "0" of the sample outputs.

18 Claims, 17 Drawing Sheets (a) $a_i = +1$ (DATA "1")   (b) $a_i = -1$ (DATA "0")

S/N TO BER CHARACTERISTIC

| A3 | A2 | A1 | A0 | D1 | D0 | A3 | A2 | A1 | A0 | D1 | D0 |
|----|----|----|----|----|----|----|----|----|----|----|----|
| 0  | 0  | 0  | 0  | 0  | 1  | 1  | 0  | 0  | 0  | 0  | 1  |
| 0  | 0  | 0  | 1  | 0  | 1  | 1  | 0  | 0  | 1  | X  | 0  |
| 0  | 0  | 1  | 0  | 0  | 1  | 1  | 0  | 1  | 0  | X  | 0  |
| 0  | 0  | 1  | 1  | X  | 0  | 1  | 0  | 1  | 1  | 1  | 0  |
| 0  | 1  | 0  | 0  | 0  | 1  | 1  | 1  | 0  | 0  | X  | 0  |
| 0  | 1  | 0  | 1  | X  | 0  | 1  | 1  | 0  | 1  | 1  | 1  |
| 0  | 1  | 1  | 0  | X  | 0  | 1  | 1  | 1  | 0  | 1  | 1  |
| 0  | 1  | 1  | 1  | 1  | 1  | 1  | 1  | 1  | 1  | 1  | 1  |

S/N TO BER CHARACTERISTIC

| A2 | A1 | A0 | D1 |
|----|----|----|----|
| 0  | 0  | 0  | 0  |
| 0  | 0  | 1  | 0  |
| 0  | 1  | 0  | 0  |
| 0  | 1  | 1  | 1  |
| 1  | 0  | 0  | 0  |
| 1  | 0  | 1  | 1  |
| 1  | 1  | 0  | 1  |
| 1  | 1  | 1  | 1  |

FSK DEMODULATION CIRCUIT

BACKGROUND OF THE INVENTION

The present invention relates to a frequency shift keying (FSK) demodulation circuit, more particularly, to an FSK demodulation circuit which performs phase detection of an FSK modulated signal and demodulates a base band digital signal.

FSK modulation is one of the digital frequency modulation (FM) methods. It allots $f_C+f_D (=f_1)$ for one of the two logics of a base band digital signal ($f_C$ being the carrier wave frequency and $f_D$ being the frequency deviation), allots $f_C-f_D=f_0$ for the other logic, and makes the signal $f_1$ or $f_0$ correspond to the two logics for transmission of information. Known FSK signal modulation methods include the synchronous detection method, the FM discriminator detection method, etc. The FM discriminator detection method involves a large number of discrete parts in the intermediate frequency band, which interferes with reduction of circuit size. Therefore, the present invention bases itself on the synchronous detection method, which is convenient for circuit size reduction.

When considering a synchronous detection method, if the base band signal speed is $f_B$ and the modulation index $I_{DX}$ ($I_{DX}=2f_D/f_B$) is small, a carrier recovery operation is required. However, when the modulation index $I_{DX}$ is comparatively large ($I_{DX}=2f_D/f_B \geqq 5$ or so, that is, when there are five or more sampling pulses in the data symbol), it is known that there is no longer a need for the above-mentioned carrier recovery operation in the demodulation operation. The present invention alludes to a simple, compact FSK demodulation circuit under these conditions. Giving an example, the FSK demodulation circuit is suited for a personal radio paging service, usually called a pocket bell or pocket pager.

One of the basic circuit portions comprising an FSK demodulation circuit is the data reproducing part, which reproduces the code of the original signal. The means for realization of the data reproducing part include, as typical conventional methods:

(1) the method of using a phase shifter and multiplier
(2) the method of using a D-type flip-flop However, as will be mentioned in detail later, of the above conventional methods, the method (1) has a problem of a difficulty in realizing the phase shifter for delaying the phase of the base band signal. That is, the frequency of the base band signal is equal to the modulation frequency and usually about several kHz, so production of a phase shifter which shifts by exactly $\pi/2$ at such a low frequency is difficult.

Further, the above method (2) involves a simple circuit structure, so is readily realizable, but the circuit does not have a filter, etc., so suffers from the problem of a susceptibility to errors in the reproduced output due to noise.

SUMMARY OF THE INVENTION

The present invention was made to resolve the above problems in the prior art and has as its object the provision of an FSK demodulation circuit which does not use a phase shifter in the structure of the data reproducing part used for the FSK demodulation and thus is easy to realize and further which reduces the generation of data error due to noise, etc.

To achieve the above-mentioned objects, the present invention provides at least two sampling means. The sampling means use the edges of one pulse train among two quadrature pulse trains after phase detection, i.e., a first pulse train and a second pulse train, to sample the logic of the other pulse train and decide on the logic of the target reproduced data from the at least two logics obtained.

BRIEF DESCRIPTION OF THE DRAWINGS

The above objects and features of the present invention will be more apparent from the following description of the preferred embodiments with reference to the accompanying drawings, wherein.

DESCRIPTION OF THE PREFERRED EMBODIMENTS

Before explaining the principle and embodiments of the present invention, an explanation will be made of the prior art and the disadvantages therein, with reference to the drawings.

Figure 1:
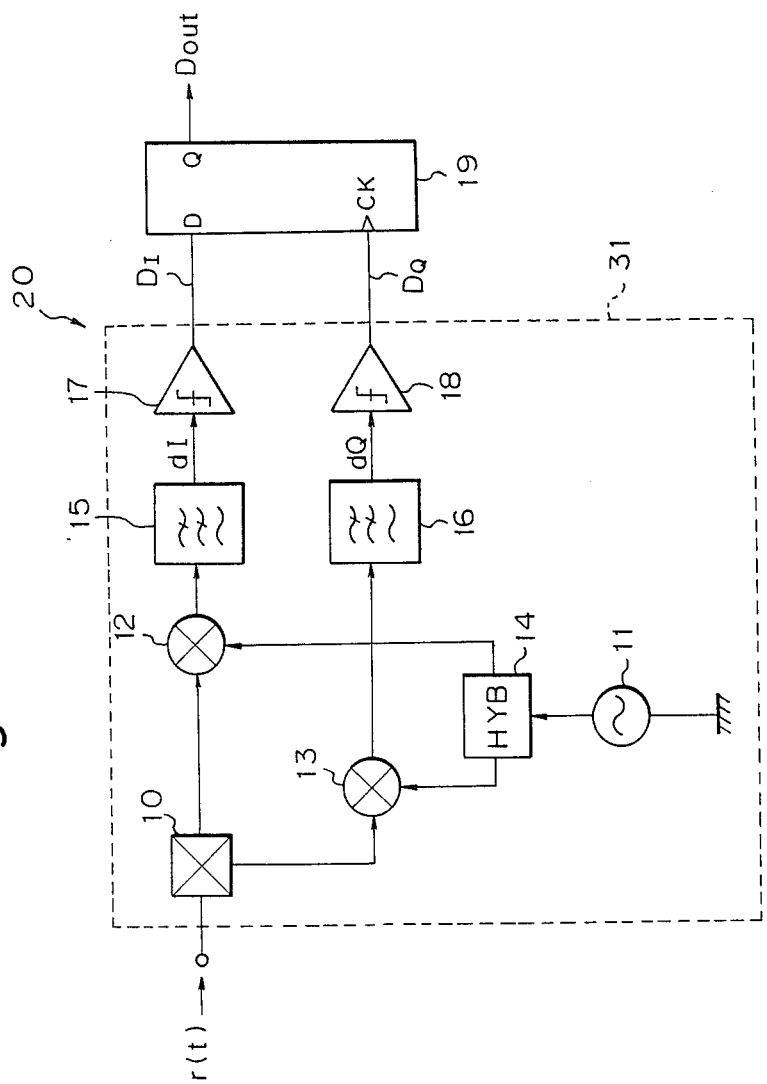
FIG. 1 is a view showing the basic structure of an FSK demodulation circuit.

FIG. 1 is a view showing the basic structure of an FSK demodulation circuit. Reference numeral 10 is a hybrid circuit which separates, in phase, into two signals an FSK modulated reception signal r(t), 11 a local oscillator, 12 and 13 mixers, 14 a hybrid circuit which separates, in quadrature phase with each other, into two signals a signal of the local oscillator 11, 15 and 16 low-pass filters, and 17 and 18 comparators, these elements comprising a phase detection circuit 31. Further, the comparators 17 and 18 and a D-type flip-flop 19 form a data reproducing part 20 which obtains reproduced date $D_{out}$. Note that a quadrature first base band signal and second base band signal are produced from the mixers 12 and 13. These are in general known as an in-phase channel signal and quadrature channel signal, that is, an I-ch signal and Q-ch signal.

If the reception signal is $$r(t) = \cos(\omega_c + a_i \omega_d)t$$

where, $\omega_c$: carrier frequency
$\omega_d$: modulation frequency
$a_i$: transmission code
$a_i = +1$ (when data is "1")
$a_i = -1$ (when data is "0")

the signal is input through the hybrid circuit 10, the split signals are sent to the mixers 12 and 13 where they are multiplied by $\sin\omega_c \cdot t$ and $\cos\omega_c \cdot t$, respectively, then $$dI(t) = -\frac{1}{2} \sin(a_i \cdot \omega_d \cdot t)$$
$$= -\frac{1}{2} a_i \sin\omega_d \cdot t \;(a_i \text{ is } a_i = +1 \text{ or } -1)$$
$$dQ(t) = \frac{1}{2} \cos(a_i \cdot \omega_d \cdot t)$$
$$= \frac{1}{2} \cos\omega_d \cdot t$$

are obtained at the low pass filters 15 and 16 as the analog base band signals of I-ch and Q-ch having the low frequency component. Further, the reproduced data $D_{out}$ (equivalent to $a_i$) is demodulated by the detection of the phase relationship by the data reproducing part 20.

In this case, there are several methods for obtaining the original data $a_i$ from the two base band analog outputs dI and dQ, i.e., the construction of the data reproducing part 20 in FIG. 1. Here, an explanation will be made of two typical methods.

(1) Method Using Phase Shifters and Multipliers

Figure 2:
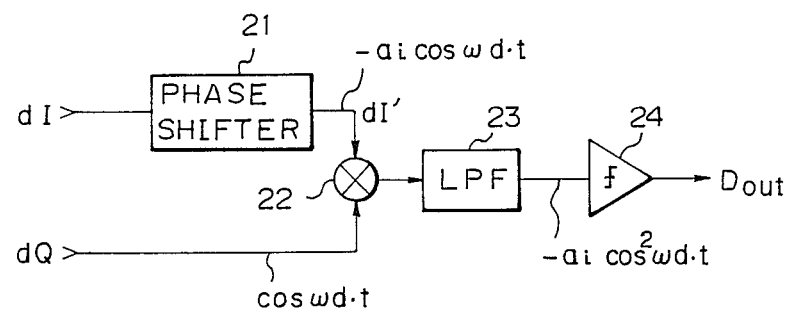
FIG. 2 is a view showing a first example of a data reproducing part.

FIG. 2 is a view showing a first example of a data reproducing part. In the FIG., 21 is a $\pi/2$ phase shifter, 22 a multiplier, 23 a low pass filter (LPF), and 24 a comparator. The signal dI', which comprises the base band analog signal dI shifted by $\pi/2$ by the phase shifter 21, becomes:

$$dI' = -\frac{1}{2} a_i \sin(\omega_d \cdot t + \pi/2)$$
$$= -\frac{1}{2} a_i \cdot \cos\omega_d \cdot t$$

The signal dI' and the other base band analog signal dQ are multiplied by the multiplier 22, to give:

$$dI' \cdot dQ = -\frac{1}{4} a_i \cdot \cos^2\omega_d \cdot t$$
$$= -a_i \cdot (1 + \cos 2\omega_d \cdot t)/8$$

Further, the sign of the output in which the $\cos 2\omega_d \cdot t/8$ is suppressed by smoothing the output dI'·dQ through the low pass filter 23 can be discriminated by the comparator 24, thereby allowing reproduction of the transmitted code $a_i$ ($= D_{out}$).

(2) Method Using D-type Flip-Flop

Figure 3:
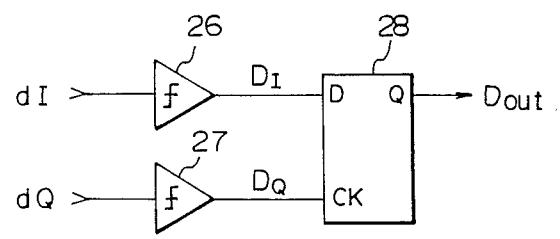
FIG. 3 is a view showing a second example of a data reproducing part.

FIG. 3 is a veiw showing a second example of a data reproducing part. Reference numerals 26 and 27 are comparators and 28 is a D-type flip-flop. Further, $D_I$ forms the I-ch base band digital pulse train, and $D_Q$ forms the Q-ch base band digital pulse train.

Figure 4:
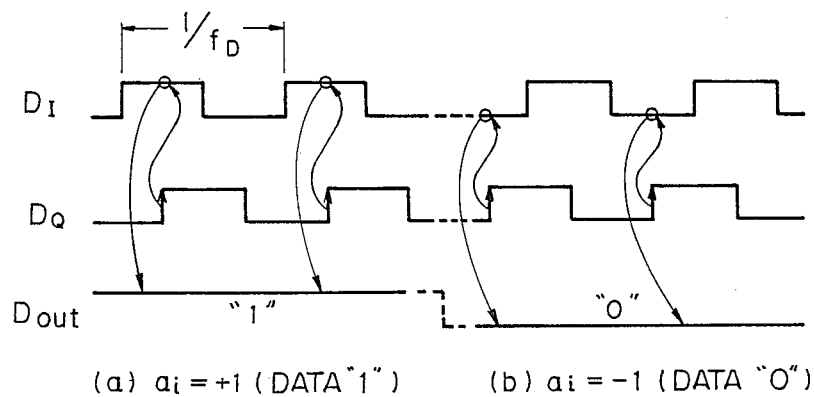
FIG. 4 is a view showing signal waveforms at key portions in the case of use of the data reproducing part of FIG. 3.

FIG. 4 is a view showing signal waveforms at key portions in the case of use of the data reproducing part of FIG. 3.

The two signals dI and dQ are converted to two logic signals through the comparators 26 and 27 to obtain the output trains $D_I$ and $D_Q$. For example, the output $D_I$ is applied to the data terminal D of the D-type flip-flop 24 and the output $D_Q$ is applied to the clock terminal CK in the same way, whereby the output of the sampling of the signal $D_I$ by the leading edge of the signal $D_Q$ is obtained at the terminal Q. Note that the relationship between the signals $D_I$ and $D_Q$ may be reversed.

At this time, the phase relationship of the data terminal D of the D-type flip-flop 28 and the clock terminal CK becomes as shown in FIGS. 4(a) and (b) in accordance with the transmitted code $a_i$, so the reproduced data $D_{out}$ is obtained at the output terminal Q of the D-type flip-flop 28.

However, in an FSK demodulation circuit using the data reproducing part shown in FIG. 2 and FIG. 3, there are the already mentioned two problems. Therefore, provision is made by the present invention of an FSK demodulation circuit which does not use phase shifters and which enables suppression of the generation of date errors due to noise.

Figure 5:
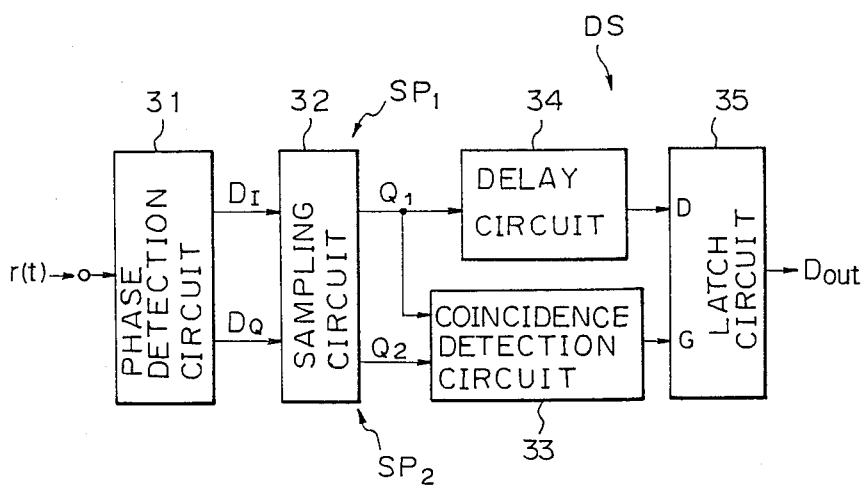
FIG. 5 is a block diagram showing a first embodiment based on the present invention.

FIG. 5 is a block diagram showing a first embodiment based on the present invention. Reference numeral 31 is the previously mentioned phase detection circuit (FIG. 1). Using the FSK modulated reception signal r(t), the I-ch and Q-ch digital base band pulse trains $D_I$ and $D_Q$ are formed. The pulse trains $D_I$ and $D_Q$ are applied to the two sampling means $SP_1$ and $SP_2$ in the case of the first embodiment. These sampling means $SP_1$ and $SP_2$ are shown simply as the sampling circuit 32. The first sampling means $SP_1$ samples the logic ("1" or "0") of the first pulse train $D_I$ by the leading edge of the second pulse train $D_Q$ to obtain the sample output $Q_1$, while the second sampling means $SP_2$ samples the logic of the second pulse train $D_Q$ by the leading edge of the first pulse train $D_I$ to obtain the sample output $Q_2$. DS is a decision means for determining the logic of $D_{out}$ from $Q_1$ and $Q_2$ and is comprised of the blocks 33, 34, and 35. The coincidence detection circuit 33 detects the coincidence of the logics of the sampled outputs $Q_1$ and $Q_2$. On the other hand, the delay circuit 34 delays the sampled output $Q_1$ by a predetermined time. Reference numeral 35 is a latch circuit, which outputs the output of the delay circuit 34 as it is upon detection of coincidence by the coincidence detection circuit 33 and outputs the output of the circuit 34 of the time of the just previous detection of coincidence when noncoincidence is detected. By this, even if noise is generated in $D_I$ and $D_Q$, no noise will appear at the reproduced output $D_{out}$ since the logic held just before is output and transmitted.

Figure 6:
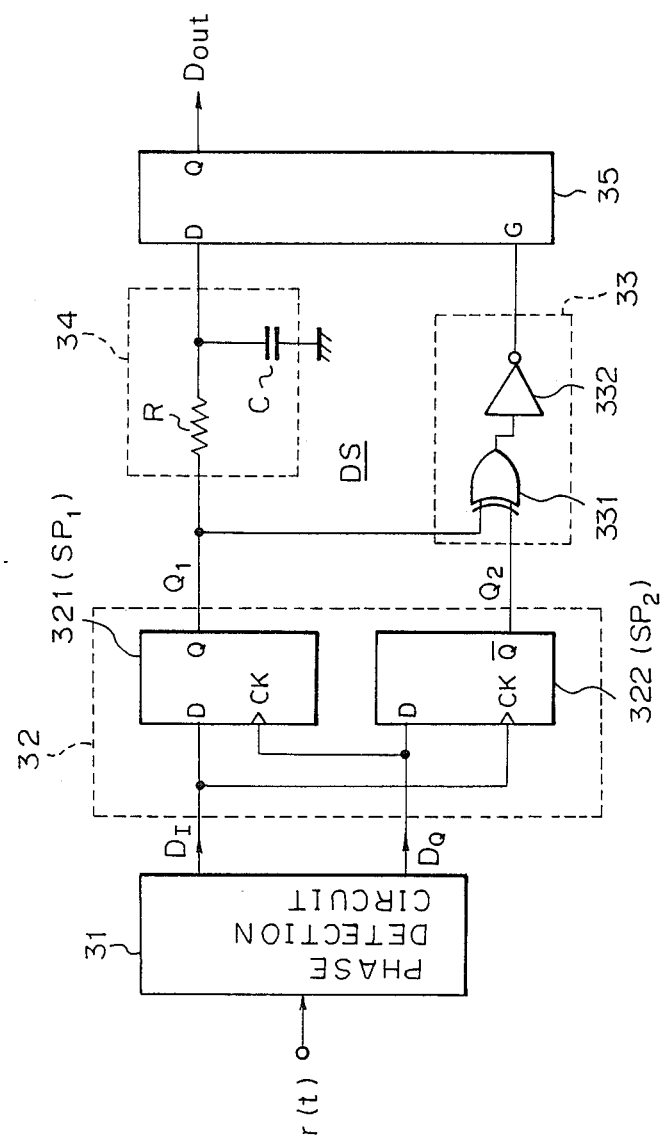
FIG. 6 is a circuit diagram showing in more detail the circuit of FIG. 5.

FIG. 6 is a circuit diagram showing in more detail the circuit of FIG. 5. Structural elements the same as those mentioned before are given the same reference numerals or symbols (same below). The sampling circuit 32 is comprised of a first D-type flip-flop 321 (first sampling means $SP_1$) which samples one of the pulse trains, e.g., $D_I$, of the two quadrature pulse trains $D_I$ and $D_Q$ output from the phase detection circuit 31 by the leading edge of the other pulse train, e.g., $D_Q$, and generates a first sample output $Q_1$ and a second D-type flip-flop 322 (second sampling means $SP_2$) which samples by the leading edge of the other pulse train $D_I$ and outputs, at its inverted output terminal $\bar{Q}$, a second sample output $Q_2$.

Further, the coincidence detection circuit 33 uses an exclusive OR (EXOR) gate 331 which receives as input the first and second sample outputs $Q_1$ and $Q_2$ and an inverter 332 which inverts the output of the gate 331. Further, for the delay circuit 34 for matching the input timing of the output of the coincidence detection circuit 33 and the sampling output $Q_1$, use is made, for example, of an RC circuit consisted of a resistor and capacitor or a circuit comprising several RC elements connected in cascade to give a delay time.

Figure 7:
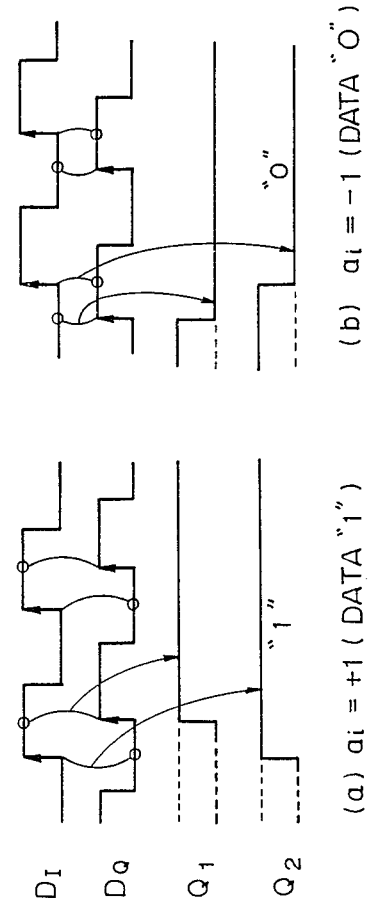
FIG. 7 is a view showing an operational timing chart based on the first embodiment of the present invention.

FIG. 7 is a view showing an operational timing chart based on the first embodiment of the present invention. This corresponds to the previously mentioned FIG. 4 showing the prior art.

First, looking at the digital base band pulse trains $D_I$ and $D_Q$ from the phase detection circuit 31 (FIG. 6), at the D-type flip-flop 321, the pulse $D_I$ is hit using the pulse $D_Q$ as a clock signal, at the leading edge thereof, and the sample output $Q_1$ obtained. Further, at the D-type flip-flop 322, the pulse $D_Q$ is hit using the pulse $D_I$ as a clock signal, at the leading edge thereof, and the sample output $Q_2$ obtained at the inverted output terminal $\bar{Q}$ of the D-type flip-flop 322. This is the case of transmission signal $a_i = +1$ shown in FIG. 7(a). On the other hand, in the case where the transmission signal is $-1$, the pulse $D_Q$ is shifted by exactly $\pi$ from the case of DATA "1" (inverted), and so becomes the waveform as shown in FIG. 7(b).

Figure 8:
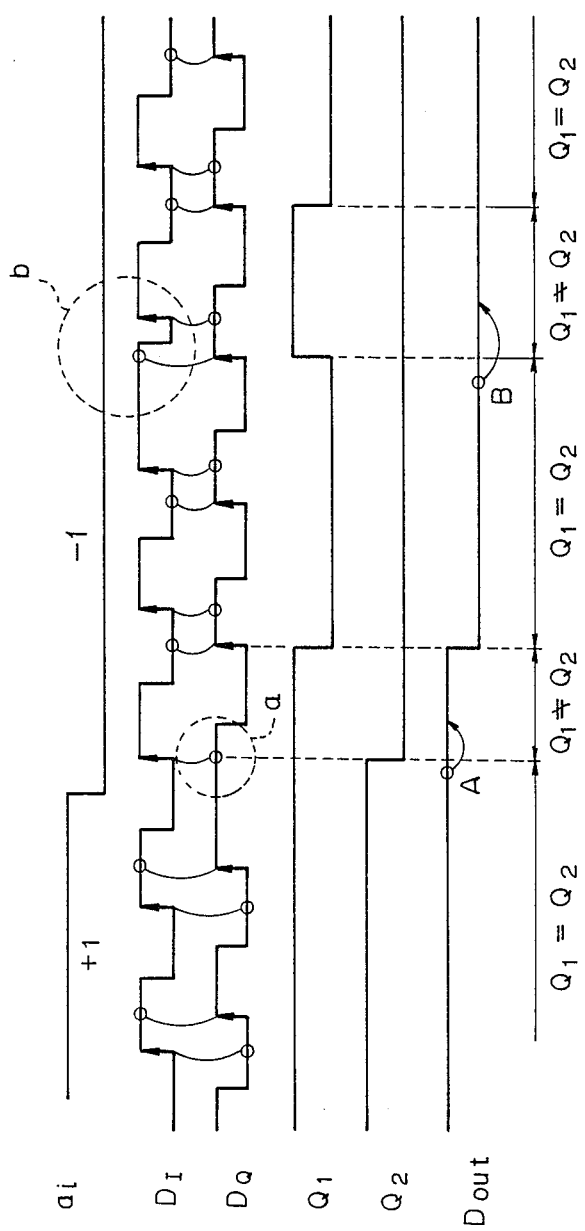
FIG. 8 is a view showing an operational timing chart showing features of the present invention based on the first embodiment of the present invention.

FIG. 8 is a view showing an operational timing chart showing features of the present invention based on the first embodiment of the present invention. The sample outputs $Q_1$ and $Q_2$ from the sampling circuit 32 of FIG. 6 are input to the coincidence detection circuit 33 where coincidence ($Q_1 = Q_2$) or noncoincidence ($Q_1 \neq Q_2$) is detected, as shown in FIG. 8. In this case, the output of the circuit 33 upon detection of coincidence becomes "1" and the output of the circuit 33 upon detection of noncoincidence becomes "0".

The latch circuit 35, which uses as input of the gate terminal G the output "1" or "0" of the coincidence detection circuit 33, outputs the D input as it is as Q when the input of the gate terminal G is "1" and, conversely, outputs the logic held directly before when it is "0". Therefore, when the coincidence circuit 33 detects coincidence ("1"), the logic of the sample pulse $Q_1$ input to the D terminal of the latch circuit 35 through the delay circuit 34 becomes the reproduced data $D_{out}$ and, when it detects noncoincidence ("0"), the logic of the sample output $Q_1$ at point A or point B is output as shown in FIG. 8 and the output Q of the latch circuit at the latest detection of coincidence, that is the detection just before, is held. The delay time of the above-mentioned delay circuit 34 is set in advance so that the sample output $Q_1$ is input to the D terminal of the latch circuit 35 after the end of the coincidence/noncoincidence detection of the coincidence detection circuit 33.

In this way, it is possible to obtain the correct reproduced data $D_{out}$ without effect from errors due to noise surrounded by the dotted line circles a and b in FIG. 8.

Figure 9:
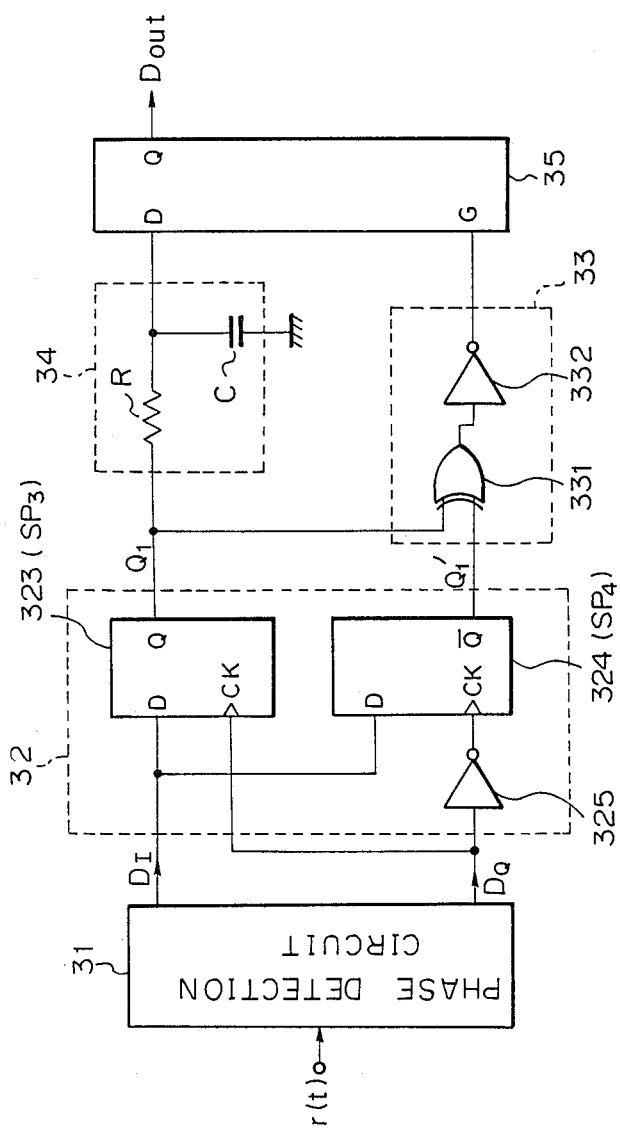
FIG. 9 is a view showing in detail a modification of the first embodiment.

FIG. 9 is a view showing in detail a modification of the first embodiment and enables comparison with the circuit of FIG. 6. In this modification, the sampling circuit 32 comprises a third sampling means $SP_3$ (D-type flip-flop 323) which samples one pulse train $D_I$ of the above-mentioned two pulse trains $D_I$ and $D_Q$ by the leading edge of the other pulse train $D_Q$ and generates a first sample output, an inverter 325 for inverting the other pulse train $D_Q$, and a fourth sampling means $SP_4$ (D-type flip-flop 324) which samples the one pulse train $D_I$ by the leading edge of the output of the inverter 325 and outputs to an inverted output terminal $\bar{Q}$ the other first sample output $Q_1'$. The other parts of the construction are the same as in FIG. 6.

Figure 10:
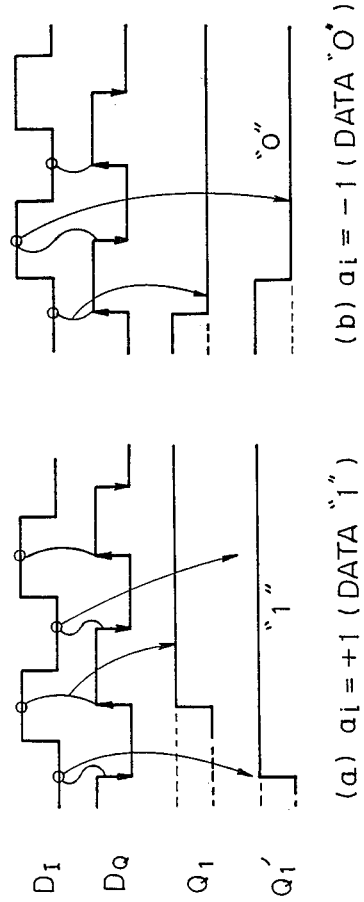
FIG. 10 is an operational timing chart of the circuit of FIG. 9.

FIG. 10 is an operational timing chart of the circuit of FIG. 9 and corresponds to the previously mentioned time chart of FIG. 7. In this modification too, the phase relationship of sampling is exactly the same as the waveform shown in FIG. 7, so the noise can be eliminated as in FIG. 8.

Further, this modification too performs the sampling at the leading edge or trailing edge of the pulse train $D_I$ and/or $D_Q$, but the same operation is achieved even if the edges are reversed and the leading edge made the trailing edge or the trailing edge made the leading edge.

As shown above, according to the FSK demodulation circuit based on the first embodiment of the present invention, the mutual edges or one of the edges of the two quadrature pulse trains of the phase detection circuit are used for sampling of the other and the coincidence/noncoincidence of the two logics (sample output) obtained in this way is detected and the disturbance in the phase relationship caused by noise is corrected, so it is possible to improve the BER (bit error rate) by a simple circuit construction.

Figure 11:
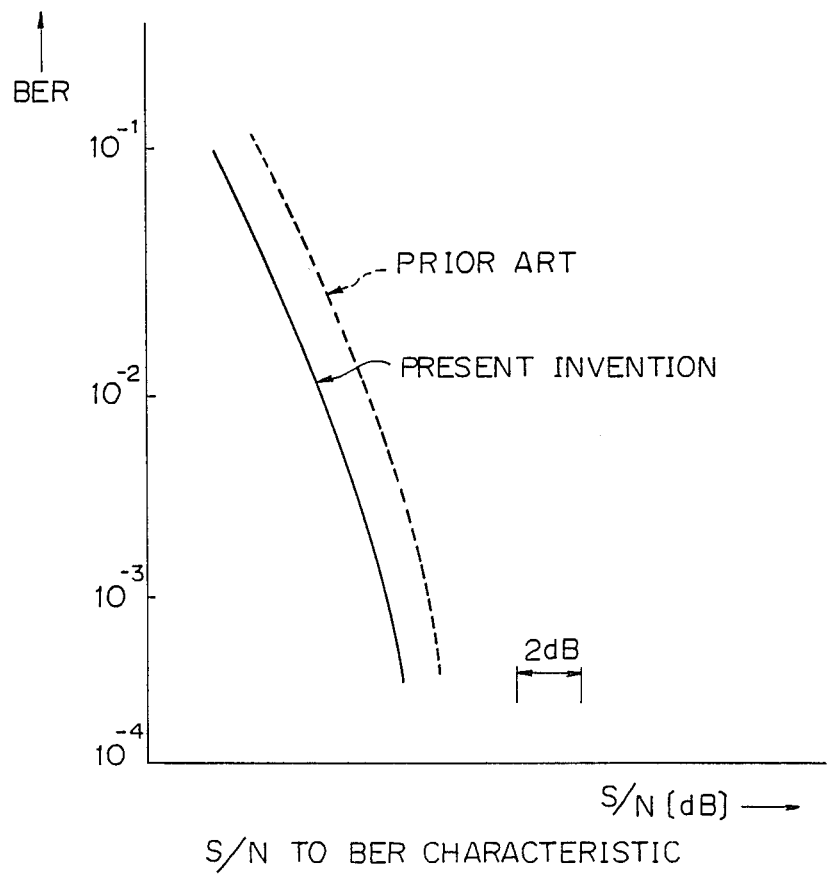
FIG. 11 is a graph showing the S/N versus BER characteristics based on a first embodiment.

FIG. 11 is a graph showing the S/N versus BER characteristics based on a first embodiment. Compared with the prior art, the present invention enables improvement of the S/N by about 1.6 dB for the same BER.

Figure 12:
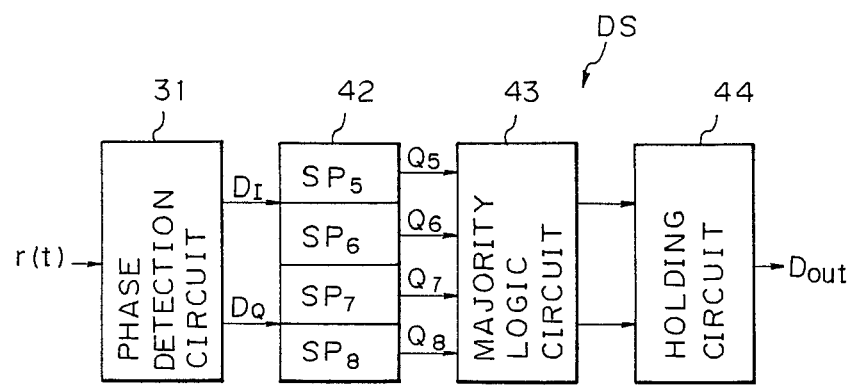
FIG. 12 is a block diagram showing a second embodiment based on the present invention.

FIG. 12 is a block diagram showing a second embodiment based on the present invention. In the figure, reference numeral 31 and reference symbols r(t), $D_I$, $D_Q$, and $D_{out}$ represent the same elements as explained with regard to the first embodiment. Reference numeral 42 is a sampling circuit comprised of four sampling means $SP_5$, $SP_6$, $SP_7$, and $SP_8$. The fifth to eighth sampling means sample the other logic of the digital base band pulse train $D_I$ and $D_Q$ by the respective leading edge and trailing edge of the same to give four sampling outputs $Q_5$, $Q_6$, $Q_7$, and $Q_8$.

Reference numeral 43 is a majority logic means which makes a majority logic decision of the sample outputs of the fifth to eighth sample outputs and outputs the results of the decision.

Reference numeral 44 is a holding means which, when a major logic decision is made at the majority logic means 43, outputs the results of the decision as the reproduced output $D_{out}$ and, when there are the same number of "1" and "0" in the majority logic decision, outputs the held previous decision.

Figure 13:
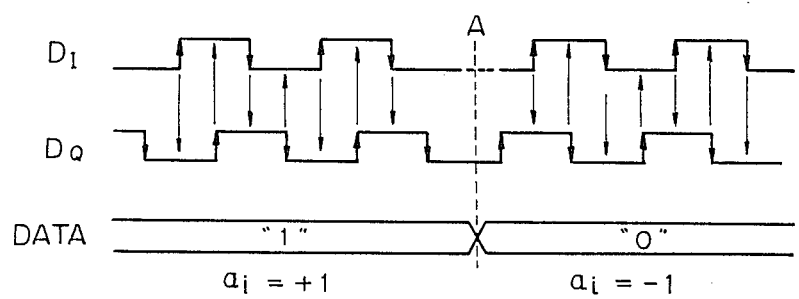
FIG. 13 is a view showing an operational timing chart based on a second embodiment of the present invention.

FIG. 13 is a view showing an operational timing chart based on a second embodiment of the present invention and corresponds to FIG. 7 of the first embodiment. In the second embodiment, phase information (that is, data) is collected at a total of four locations: the leading edge and trailing edge of the first pulse train $D_I$ and the leading edge and trailing edge of the second pulse train $D_Q$.

Figure 14:
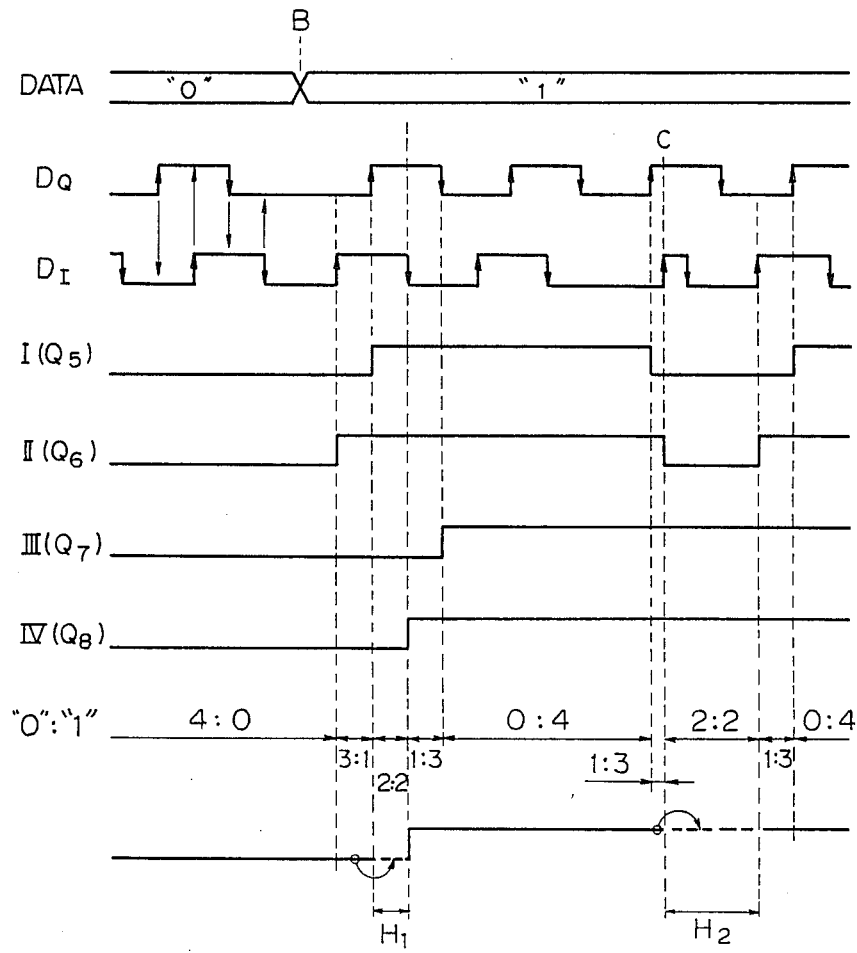
FIG. 14 is a timing chart showing the steps of data reproduction of the second embodiment.

FIG. 14 is a timing chart showing the steps of data reproduction of the second embodiment. In the FSK demodulation circuit of the second embodiment, the phase information of the above four locations (sample output) is extracted and majority logic processing is performed on the results of the extraction to suppress the generation of errors due to noise.

When making the majority logic decision on the four sample outputs, if the number of sample outputs is four to zero or three to one, there is no problem in the decision, but when two to two, the processing method becomes a problem.

In FIG. 14, the data changes at point B, whereby the two pulse trains $D_Q$ and $D_I$ are considered to change as shown. In this case, if the output when sampling the pulse train $D_I$ by the leading edge of the pulse train $D_Q$ is I ($=Q_5$), the inverted output when sampling the pulse train $D_Q$ by the leading edge of the pulse train $D_I$ is II ($=Q_6$), the inverted output when sampling the pulse train $D_I$ by the trailing edge of the pulse train $D_Q$ is III ($=Q_7$), and the output when sampling the pulse train $D_Q$ by the trailing edge of the pulse train $D_I$ is IV ($=Q_8$), the changes in the sample outputs are as shown.

Comparing the number of the sample outputs I to IV which are "0" and the number which are "1", around when a logic change occurs at point B, there is a change $4:0 \rightarrow 3:1 \rightarrow 2:2 \rightarrow 1:3 \rightarrow 0:4$. In this case, it is possible to perform a correct majority logic decision by making 4:0 and 3:1 correspond to, for example, the data "0" and making 1:3 and 0:4 correspond to, for example, the data "1", but it is not possible in general to perform a majority logic decision with 2:2. Therefore, in this case, if the state just before this is held ($H_1$ in FIG. 14), then it is possible to obtain a decision result correctly showing the change of the data. In this case, a delay is caused in the reproduced data $D_{out}$ (time for making the majority logic decision), but this does not have any adverse effect. This is because $D_{out}$ is just shifted a little overall.

Further, when an error arises in the data $D_I$, for example, as shown at point C in FIG. 14, due to noise etc. between the data symbols, a change of $0:4 \rightarrow 1:3 \rightarrow 2:2 \rightarrow 1:3 \rightarrow 0.4$ occurs around point C, but even in this case, by holding the state of the data just before the generation of error as the majority logic decision for 2:2, it is possible to make a correct decision and reproduce the data.

In this way, when there are the same number of "0" and "1", the state of data just before is held, so that it is possible to perform demodulation using four bits of phase information.

Figure 15:
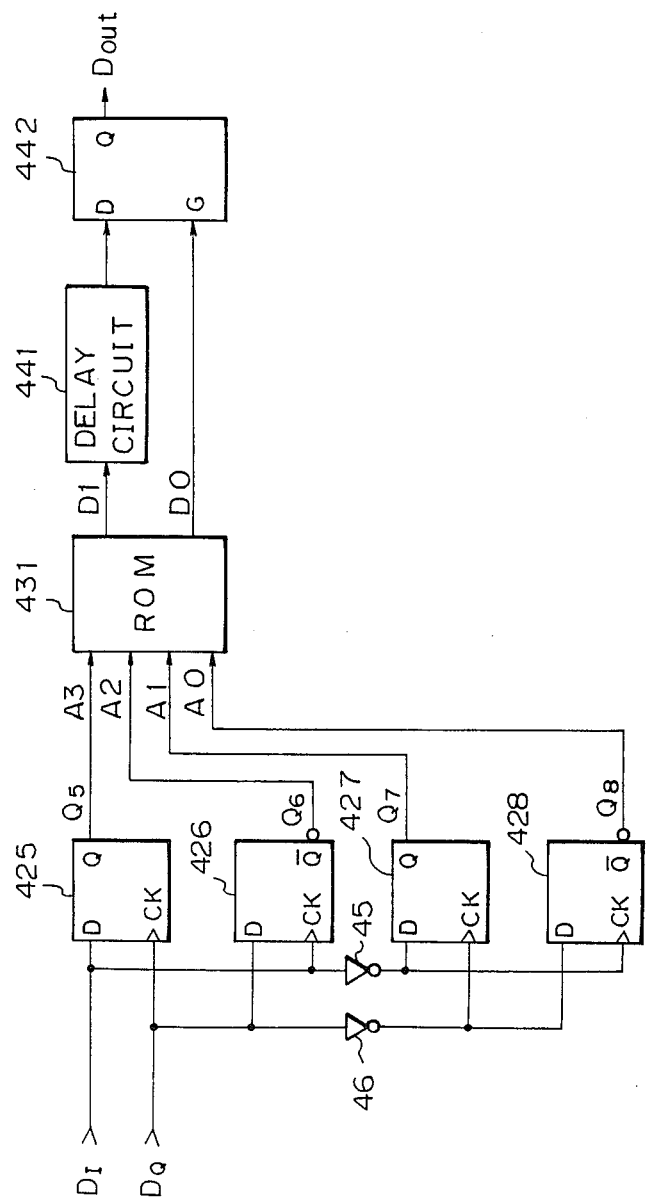
FIG. 15 is a circuit diagram showing in more detail the circuit of FIG. 12.

FIG. 15 is a circuit diagram showing in more detail the circuit of FIG. 12. In this figure, reference numerals 425 to 428 are D-type flip-flops (D-FF), 45 and 46 are inverters, 431 is a memory, for example, a read only memory (ROM), 441 is a delay circuit, and 442 is a latch circuit. Structural element 431 corresponds to the majority logic decision means 43 (FIG. 12), and elements 441 and 442 correspond to the holding means 44 (FIG. 12).

$D_I$, which forms one of the pulse trains of the results of the afore-said binary digitalized phase detection, is applied to the data terminal of the D-FF 425 and the clock terminal CK of the D-FF 426 and is inverted by the inverter 45 and applied to the data terminal of the D-FF 427 and the clock terminal CK of the D-FF 428. The other pulse train $D_Q$ is applied to the clock terminal CK of the D-FF 425 and the data terminal D of the D-FF 426 and is inverted by the inverter 46 and applied to the clock terminal CK of the D-FF 427 and the data terminal D of the D-FF 428. By this, the four two-logic signals I to IV, that is, the sample outputs $Q_5$ to $Q_8$, showing the aforementioned phase state, occur at the output terminals Q, $\bar{Q}$, Q, and $\bar{Q}$ of the D-FF 425 to 428. These signals I to IV are given to the ROM 431 as the addresses A3 to A0.

The ROM 431 has written therein, corresponding to the addresses A3 to A0 (I to IV), data D1 of the results of the majority logic decision corresponding to combinations of "1" and "0" of the addresses. When one address is designated, the corresponding decision result data D1 is output. At the same time, when the combination of the "1" and "0" of the signals I to IV is 2:2, the decision state data D0 of "0" is output and when it is something else, one of "1" is output.

The decision result data D1 passes through the delay circuit 441 and is applied to the data terminal D of the latch circuit 442. The decision state data D0 is applied to the gate terminal G of the latch circuit 442. When "1" is given to the gate terminal G, the latch circuit 442 latches the signal of the data terminal D and outputs it at the output Q. On the other hand, when "0" is given to the gate terminal G, the latch circuit 442 does not change in state, but maintains the state just before as it is. By this, the results of the above-mentioned phase decision of "1" or "0" is obtained by the majority logic decision on the two pulse trains $D_I$ and $D_Q$ and the reproduced data $D_{out}$ can be output.

In this case, the delay circuit 441 is provided so as to transmit the data D1 to the data terminal D after the change in state of the decision state data D0 at the gate terminal G is completed. This is because in the state of 2:2, it is necessary to perform gating while the data input D of the previous state is held in the latch circuit 442.

Figures 16, 17:
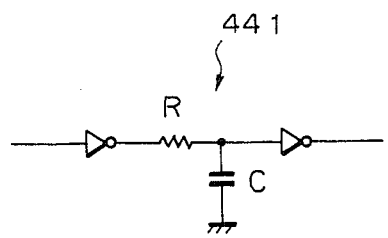
FIG. 16 is a circuit diagram showing a specific example of the delay circuit of FIG. 15.
FIG. 17 is a matrix diagram showing the contents of the ROM of FIG. 15.

FIG. 16 is a circuit diagram showing a specific example of the delay circuit of FIG. 15 and shows the same circuit as that in the above-mentioned FIG. 6 and FIG. 9. However, FIG. 16 shows detail down to the inverter for level matching.

FIG. 17 is a matrix diagram showing the contents of the ROM of FIG. 15. In the top row, A3 to A0 are addresses for accessing the ROM 431, D1 is the decision result data, and D0 is the decision state data, as already mentioned. The X in the matrix means "don't care".

Note that it is possible to replace the ROM 431 shown in FIG. 15 used as the majority logic decision means 43 in the structure of FIG. 12 with a combination of logic gate circuits and to perform the majority logic decision by a logical operation. Alternatively, it is possible to construct the majority logic decision means 43 by an analog circuit.

Figure 18:
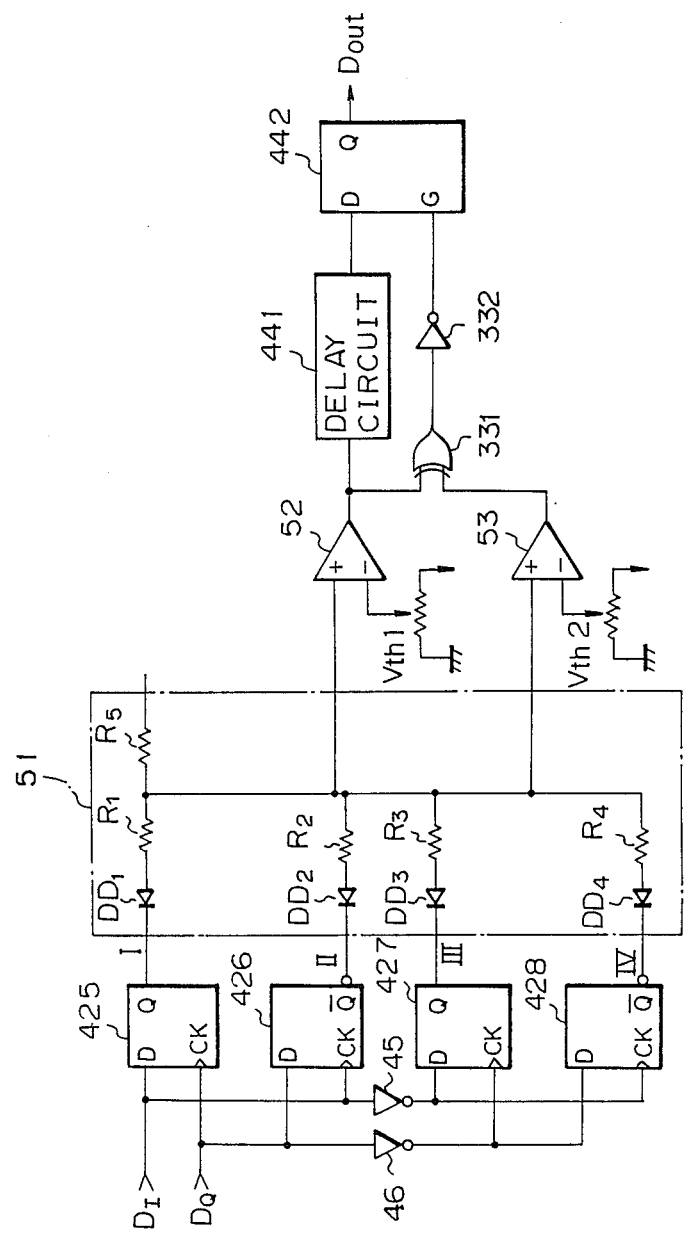
FIG. 18 is a circuit diagram showing an example in the case of constructing the circuit of FIG. 12 using an analog circuit.

FIG. 18 is a circuit diagram showing an example in the case of constructing the circuit of FIG. 12 using an analog circuit. In the figure, portions the same as in FIG. 15 are shown by the same reference numerals, 51 is an analog adder circuit, 52 and 53 are comparators, 331 is an EXOR gate, and 332 is an inverter.

In FIG. 18, the four logic signals I to IV ($Q_5$ to $Q_8$) are produced in the same way as the case of FIG. 15 by the signals $D_I$ and $D_Q$ of the phase detection results of the logic "1" or "0". The analog adder circuit 51 is comprised of diodes $DD_1$ to $DD_4$ and resistors $R_1$ to $R_5$. The signals I to IV are added under the analog mode. The signals I to IV have a predetermined level corresponding to the "1" or "0" state thereof, so means level is output from the analog adder circuit 51.

The comparator 52 has an intermediate level, as the threshold voltage $V_{th1}$, of the case where there are three "1" logics and the case where there are two "1" at the threshold voltage $V_{th1}$, while the comparator 53 has the intermediate level of the case where there are two "1" logics and the case where there is one "1" as the threshold voltage $V_{th2}$. Therefore, the comparator 52 outputs "1" when there are four or three "1" logics, and the comparator 53 outputs "1" when there are four to two "1" logics. Therefore, when there are two "1" logics, the outputs of the two comparators 52 and 53 do not coincide and the EXOR gate 331 detects the state and provides an EXOR output. The output of the EOR gate 331 inverts after passing through the inverter 332 and is given to the gate terminal G of the latch circuit 442, so the latch circuit 441 holds the value just before in this state. Therefore, the latch circuit 441 can perform a majority logic decision on the pulse trains $D_I$ and $D_Q$ showing the results of the phase detection of logic "1" or "0" in the same way as the case of FIG. 15 and outputs the reproduced data $D_{out}$.

Figure 19:
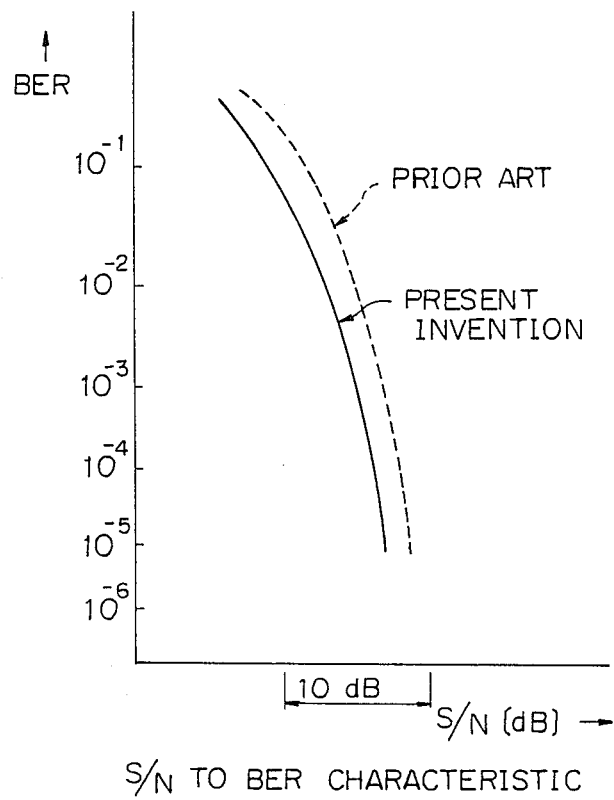
FIG. 19 is a graph showing the S/N versus BER characteristics based on the second embodiment.

FIG. 19 is a graph showing the S/N versus BER characteristics based on the second embodiment and corresponds to the graph of the previously explained FIG. 11. Comparing the case of the present invention, shown by the solid line with the conventional method shown by the dotted line, an improvement is shown in the S/N of about 2 dB under the condition of a BER of $10^{-2}$. The same figure shows the measured value when the demodulation index is about 18.

In the first embodiment mentioned above, use may be made of the two sampled outputs $Q_1$ and $Q_2$ (FIG. 5) or $Q_1$ and $Q_1'$ (FIG. 9) to determine the logic of the reproduced data $D_{out}$. In the above-mentioned second embodiment, use is made of the four sample outputs $Q_5$, $Q_6$, $Q_7$, and $Q_8$ (FIG. 12) to determine the logic of the reproduced data $D_{out}$. In the third embodiment mentioned below, use is made of three sample outputs $Q_9$, $Q_{10}$, and $Q_{11}$, between the above two and four outputs, to determine the logic of the reproduced data $D_{out}$.

Figure 20:
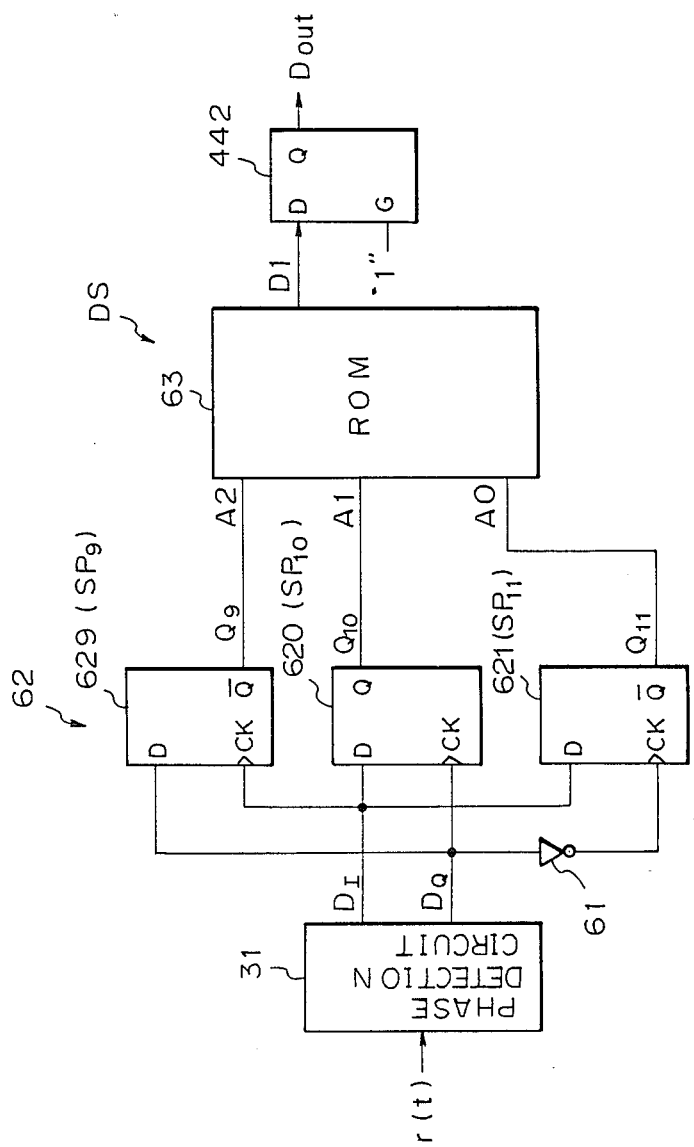
FIG. 20 is a block diagram showing a third embodiment of the present invention.

FIG. 20 is a block diagram showing a third embodiment of the present invention. The difference from the second embodiment is that provision is made of three ninth to 11th D-type flip-flops 629, 620, and 621 forming the ninth, 10th, and 11th sampling means ($SP_9$, $SP_{10}$, and $SP_{11}$), thereby comprising the sampling circuit 62. Further, the ROM 63 forming the decision means DS reads the results of the majority logic decision considering the three sample outputs $Q_9$, $Q_{10}$, and $Q_{11}$ as the addresses A2, A1, and A0. In this case, since in a majority logic decision, there is no such thing as a tie (0:3, 1:2, 2:1, or 3:0), the gate terminal G of the latch circuit 442 always receives an input of "1". The output of the latch circuit 442 becomes the reproduced data $D_{out}$. Further, the inverter 61 in the figure samples the logic of the pulse train $D_I$ at the trailing edge of the pulse train $D_Q$.

Figures 21, 22:
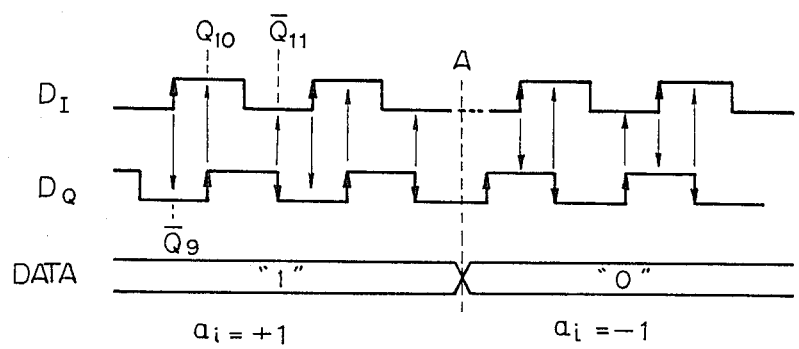
FIG. 21 is a matrix diagram showing the contents of the ROM of FIG. 20.
FIG. 22 is a view showing an operational timing chart based on the third embodiment of the present invention.

FIG. 21 is a matrix diagram showing the contents of the ROM of FIG. 20 and corresponds to the above-mentioned FIG. 17.

FIG. 22 is a view showing an operational timing chart based on the third embodiment of the present invention and corresponds to the above-mentioned FIGS. 7, 10, and 13. Note that this shows an example of sampling of the pulse train $D_I$ at the leading edge and trailing edge of the pulse train $D_Q$, but it is possible to conversely sample the logic of the pulse train $D_Q$ by the leading edge and trailing edge of the pulse train $D_I$. FIG. 22 shows the example of sampling $D_Q$ at the leading edge of $D_I$.

As explained above, according to the present invention, it is possible to realize an FSK demodulation circuit improved in the S/N versus BER characteristic compared withthe prior art.

We claim:

1. A frequency shift keying (FSK) demodulation circuit having:
   phase detection means which receives as an input an FSK modulated reception signal and performs phase detection on the same so as to produce quadrature I-ch and Q-ch analog base band signals and which further converts said analog base band signals to digital signals and outputs a first pulse train and a second pulse train, respectively, and
   data reproducing means which reproduces the original data from the first pulse train and the second pulse train to output reproduced data,
   said data reproducing means comprising:
   first sampling means which uses an edge of the second pulse train and samples the logic of the first pulse train to obtain a first sample output;
   second sampling means which uses an edge of the first pulse train and samples the inverted logic of the second pulse train to obtain a second sample output, said first and second sampling means using the edges of the second and first pulse trains, respectively, for sampling the logics at mutually different timings;
   decision means which receives as inputs the sample outputs from said first and second sampling means and determines the logic of said reproduced data by a predetermined decision operation on the sample outputs, said decision means including a coincidence detection part which detects coincidence or noncoincidence of the logic levels of said first and second sample outputs and a latch circuit which forms the logic level of said reproduced data using the current logic level upon coincidence and forms the logic level of said reproduced data with the logic level just before, held internally, upon noncoincidence; and
   delay means for applying a predetermined delay to said first sample output and applying the delayed first sample output to said latch circuit, said delay means providing a delay time set substantially equal to the time required for detection of coincidence at said coincidence detection part.

2. An FSK demodulation circuit according to claim 1, wherein said first and second sampling means are comprised of first and second D-type flip-flops receiving as D inputs said first and second pulse trains, respectively, and as clock inputs the second and first pulse trains, respectively, and wherein said first and second sample outputs are obtained from a Q output and a $\overline{Q}$ output of said first and second D-type flip-flops, respectively.

3. An FSK demodulation circuit according to claim 1, wherein said coincidence detection part is comprised of an EXOR gate receiving as inputs said first and second sample outputs and an inverter connected to the output of the EXOR gate and, upon coincidence of the first and second sample outputs, outputs logic "1" from said inverter and upon noncoincidence of the first and second sample outputs, outputs logic "0", and controls said latch circuit.

4. A frequency shift keying (FSK) demodulation circuit having:
   phase detection means which receives as an input an FSK modulated reception signal and performs phase detection on the FSK modulated reception signal so as to produce quadrature I-ch and Q-ch analog base band signals and which further converts said analog base band signals to respective digital signals and outputs a first pulse train and a second pulse train, respectively; and
   data reproducing means which reproduces the original data from the first pulse train and the second pulse train and outputs a reproduced data,
   said data reproducing means comprising:
   first sampling means which uses the leading edge of the second pulse train and samples the logic of the first pulse train to obtain a first sample output;
   second sampling means which uses the trailing edge of the second pulse train and samples the inverted logic of the first pulse train to obtain a second sample output;
   means for inverting the second pulse train prior to its use by said second sampling means;
   decision means which receives as input the sample outputs from said first and second sampling means and determines the logic of said reproduced data by a predetermined decision operation on the sample outputs, said decision means including a coincidence detection part which detects coincidence or noncoincidence of the logics of said first and second sample outputs and a latch part which forms the logic of said reproduced data using the current logic level upon coincidence and forms the logic of said reproduced data with the logic level just before, held internally, upon noncoincidence.

5. An FSK demodulation circuit according to claim 4, wherein said data reproducing means further comprises delay means for applying a predetermined delay to said sample first output and applying the same to said latch part, said delay means providing a delay time set substantially equal to the time required for detection of coincidence at said coincidence detection part.

6. An FSK demodulation circuit according to claim 4, wherein said first sampling means is comprised of a first D-type flip-flop receiving as a D input and clock input said first and second pulse trains, respectively, and said second sampling means is comprised of a second D-type flip-flop receiving as a D input said first pulse train and as a clock input said inverted second pulse train, said first and second sample outputs being obtained from the $\overline{Q}$ output and the Q output of said first and second D-type flip-flops, respectively.

7. An FSK demodulation circuit according to claim 4, wherein said coincidence detection part is comprised of an EXOR gate receiving as inputs said first and second sample outputs and inverting means for inverting the output of the EXOR gate and, upon coincidence of the first and second sample outputs, outputs logic "1" from said inverting means and upon noncoincidence of the first and second sample outputs, outputs logic "0" and controls said latch part.

8. A frequency shift keying (FSK) demodulation circuit having:
   phase detection means which receives as an input an FSK modulated reception signal and performs phase detection on the FSK modulated reception signal so as to produce quadrature I-ch and Q-ch analog base band signals and which further converts said analog base band signals to respective digital signals and outputs a first pulse train and a second pulse train, respectively; and
   data reproducing means which reproduces the original data from the first pulse train and the second pulse train and outputs reproduced data,
   said data reproducing means comprising:
   first, second, third and fourth sampling means which use the leading edge and the trailing edge of the second pulse train and sample the logic or inverted logic of the first pulse train and use the leading edge and the trailing edge of the first pulse train and sample the logic or inverted logic of the second pulse train to obtain first, second, third and fourth sample outputs; and
   decision means for determining the reproduced data, comprising majority logic decision means which makes a majority logic decision based on the sample outputs and outputs a decision result, and holding means which, when the decision result is of a majority of the logic level "1", transmits "1" as the logic of the reproduced data and, when the decision result is of a majority of the logic level "0", transmits "0".

9. An FSK demodulation circuit according to claim 8, wherein when the decision result is of the same number of logic levels "1" and "0", said holding means outputs the previously held logic as it is and uses it as the logic of the reproduced data.

10. An FSK demodulation circuit according to claim 9, wherein said decision means further comprises delay means provided between said majority logic decision means and said holding means, said delay means for giving a delay time to the decision result set substantially equal to the time required for said majority logic decision.

11. An FSK demodulation circuit according to claim 8, wherein said first sampling means is comprised of a first D-type flip-flop and receives as a D input and a clock input said first and second pulse trains, respectively, and said third sampling means is comprised of a third D-type flip-flop which receives as a D input and a clock input said first and second pulse trains, respectively, through first and second inverters, and
   said second sampling means is comprised of a second D-type flip-flop and receives as a D input and a clock input said second and first pulse trains, respectively, and said fourth sampling means is comprised of a fourth D-type flip-flop which receives as a D input and a clock input said second and first pulse trains, respectively, through the second and first inverters.

12. An FSK demodulation circuit according to claim 8, wherein said majority logic decision means comprises a memory which receives as address inputs said sample outputs and a logic predetermined in accordance with combinations of logic levels "1" and "0" of said sample outputs is read out from said memory and transmitted to said holding means.

13. An FSK demodulation circuit according to claim 8, wherein said holding means is comprised of a latch circuit.

14. An FSK demodulation circuit according to claim 8, wherein said majority logic decision means is comprised of a logic gate.

15. an FSK demodulation circuit according to claim 8, wherein said majority logic decision means is comprised of an analog adder circuit.

16. A frequency shift keying (FSK) demodulation circuit having:
   phase detection means which receives as an input an FSK modulated reception signal and performs phase detection on the FSK modulated receptions signal so as to produce quadrature I-ch and Q-ch analog base band signals and which further converts said analog base band signals to respective digital signals and outputs a first pulse train and a second pulse train, respectively; and
   data reproducing means which reproduces the original data from the first pulse train and the second pulse train and outputs reproduced data,
   said data reproducing means comprising:
   first, second and third sampling means which use the leading edge and the trailing edge of the first and second pulse trains and sample the logic or inverted logic of the first and second pulse trains to obtain first, second and third sample outputs; and
   decision means for determining the reproduced data, comprising majority logic decision means for making a majority logic decision based on the sample outputs and outputs a decision result, and holding means which, when said decision result is of a number of logic levels "1" greater than a number of logic levels "0", transmits "1" as the logic of the reproduced data and, when the number of logic levels "0" in said decision result is greater than the number of logic levels "1", transmits "0".

17. An FSK demodulation circuit according to claim 16, wherein said first sampling means is comprised of a first D-type flip-flop and receives as its clock input and D input the first and second pulse trains, respectively, said second sampling means is comprised of a second D-type flip-flop and receives as its clock input and D input the second and first pulse trains, respectively and said third sampling means is comprised of a third D-type flip-flop and receives as its D input the first pulse train and as its clock input the second pulse train which has passed through an inverter.

18. An FSK demodulation circuit according to claim 16, wherein said majority logic decision means is comprised of a memory which receives as address inputs said first, second and third sample outputs, and a logic predetermined in accordance with combinations of logic levels "1" and "0" of said sample outputs is read out from said memory and transmitted to said holding means.

* * * * *